(12) United States Patent
Krishnamoorthy et al.

(10) Patent No.: US 11,679,939 B1
(45) Date of Patent: Jun. 20, 2023

(54) EXTERNAL MOBILITY SYSTEMS FOR HEAVY MACHINERY AND EQUIPMENT

(71) Applicant: Amazon Technologies, Inc., Seattle, WA (US)

(72) Inventors: Ganesh Krishnamoorthy, Seattle, WA (US); Vivek S. Narayanan, Sammamish, WA (US); Rajeev Dwivedi, Sammamish, WA (US); Mohit Malik, Seattle, WA (US); Shahid Azad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 17/188,745

(22) Filed: Mar. 1, 2021

(51) Int. Cl.
*B65G 17/26* (2006.01)
*F16C 32/06* (2006.01)
*B65G 7/06* (2006.01)
*B65G 1/04* (2006.01)

(52) U.S. Cl.
CPC ............... *B65G 17/26* (2013.01); *B65G 1/04* (2013.01); *B65G 7/06* (2013.01); *F16C 32/0603* (2013.01)

(58) Field of Classification Search
CPC .. B65G 7/06; B65G 1/04; B65G 17/26; F16C 32/0603
See application file for complete search history.

(56) References Cited

U.S. PATENT DOCUMENTS

| | | | | | |
|---|---|---|---|---|---|
| 3,282,359 | A | * | 11/1966 | Satterfield, Jr. ........ | B60V 3/025 414/676 |
| 3,822,761 | A | * | 7/1974 | Vaughen ................... | B60V 1/16 180/125 |
| 7,123,988 | B2 | * | 10/2006 | Russell ................... | G06Q 10/08 198/465.1 |
| 2019/0050795 | A1 | * | 2/2019 | Pankratov ............ | B65G 1/0485 |

* cited by examiner

*Primary Examiner* — James R Bidwell
(74) *Attorney, Agent, or Firm* — Eversheds Sutherland (US) LLP

(57) ABSTRACT

Systems, methods, and apparatuses are disclosed for external mobility systems for heavy machinery and equipment. In one embodiment, an example system may include a first module, a second module coupled to the first module, and a third module coupled to the first module and the second module. Systems may include an air bearing system disposed under the third module, where the air bearing system is configured to apply an upward force on the third module, and an air supply coupled to the air bearing system. The upward force on the third module may reduce a static friction of the third module with respect to a floor surface by at least 90%, such that the third module can slide from a default position to an expanded position.

20 Claims, 13 Drawing Sheets

EXTERNAL MOBILITY SYSTEMS FOR HEAVY MACHINERY AND EQUIPMENT

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

Figure 1:
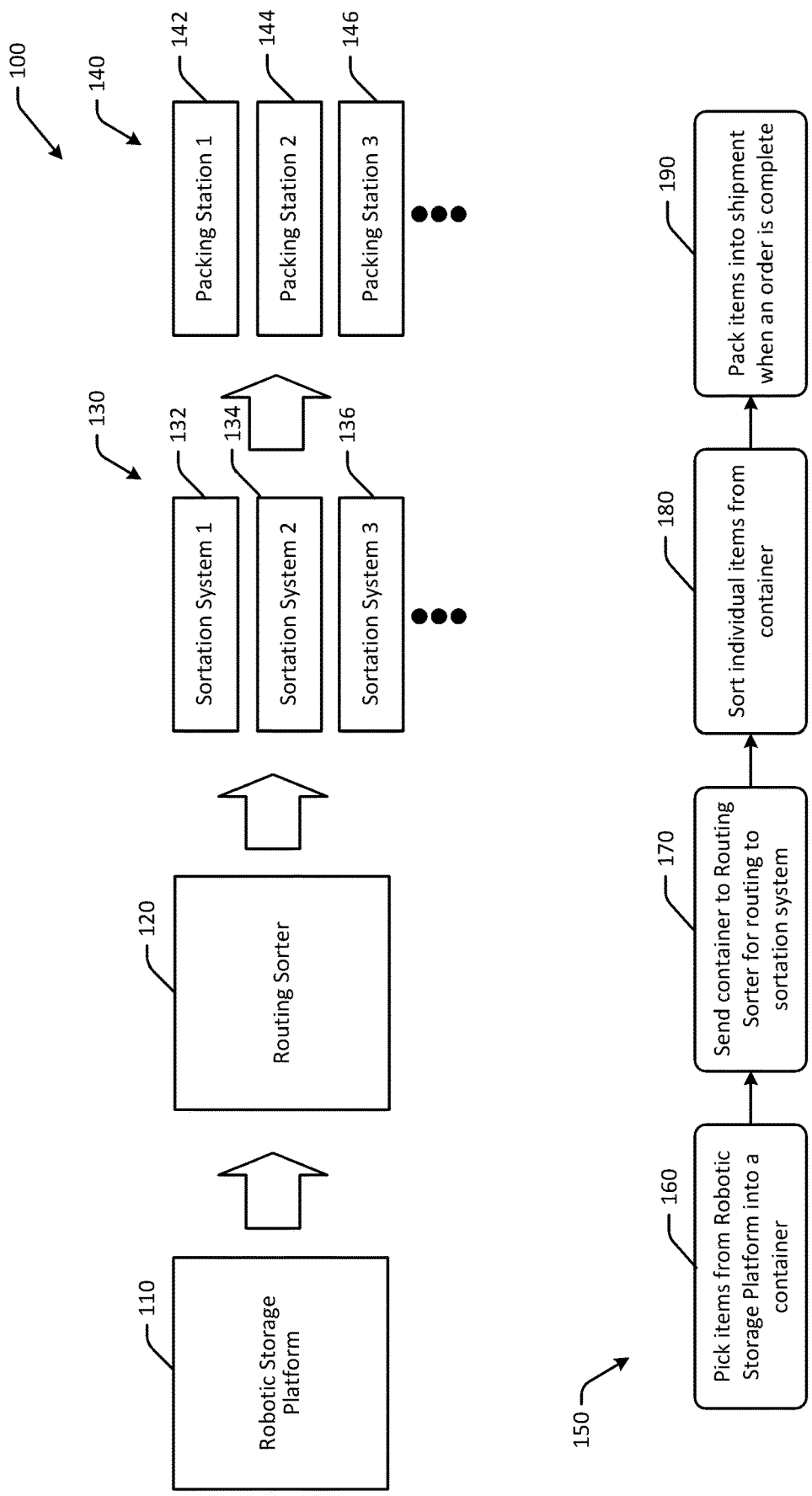
FIG. 1 is a hybrid schematic illustration of an example use case for external mobility systems for heavy machinery and equipment and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

Machines, such as sortation systems, robots, and other machinery, may be used for various functions in a facility, such as sortation, movement or transport of containers or items, and so forth. Some machines may be very large and heavy, such as over 30 feet tall and weighing several tons. Depending on the design of a machine, access to internal components of a machine may be difficult, which may make maintenance and repairs of machines difficult and time consuming. For example, some sortation systems may have containers on both sides, where items or packages can be sorted into containers on either side of an aisle by robots moving in the aisle. Access to the aisle may be difficult as access may be restricted. In some cases, maintenance for some machines may necessitate taking the machine out of service and disassembling large portions of the machine. Such projects may be further complicated due to the scale and size of some machines.

In the case of sortation systems, some sortation systems may be highly automated and complex in the sense that several different automated machines may be used for sortation of items. For example, a sortation system may be formed of several individual subsystems or modules that are interdependent and interconnected for their overall functionality. These modules may be physically connected to each other or in close proximity to each other. However, this also presents a highly challenging situation for accessibility to various parts of the machine for maintenance, trouble shooting, etc.

Embodiments of the disclosure provide external mobility systems and methods for use with heavy machinery, such as sortation systems. The systems and methods described herein may facilitate easy separation of modules or subsystems of a machine, so as to enable easy access to internal components of machines for maintenance, repair, and so forth. Some embodiments include an integrated lift and move system that enables various parts of a machine to be physically separated from the rest of the machine temporarily. The modules or subsystems of the machine can then be moved to provide access, and then quickly reassembly after maintenance, inspection, troubleshooting, or repairs are completed. Some embodiments may be configured to separate modules that are freestanding and/or adjacent to static modules of a machine. Some embodiments may include mechanisms to physically assume the weight of the machine modules for motion, and may use various mechanisms to guide movement of machine modules, such as embedded rails on the ground, air bearing systems, and other mechanisms. Some embodiments may implement air bearing systems disposed underneath a machine module to lift the machine module, which may in turn allow for the lifted machine module to be manually pushed or pulled in a certain direction. Such embodiments may use air bearing systems to reduce traction or static friction required to move the module by many orders of magnitude. Once the air bearing system is used to float the module, the machine module can be set in motion manually with or without a guide track, or mechanically using an autonomously guided vehicle, actuator, or other component configured to impart motion to the machine module.

Referring to FIG. 1, an example use case 100 for external mobility systems for heavy machinery and equipment and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

External mobility systems as described herein may be used with any of the equipment described with respect to FIG. 1. For example, the sortation systems may be heavy machinery with a number of modules or machines. The systems described herein may be used to separate the modules and provide access for easy repairs, maintenance, inspection, and so forth.

Figure 2:
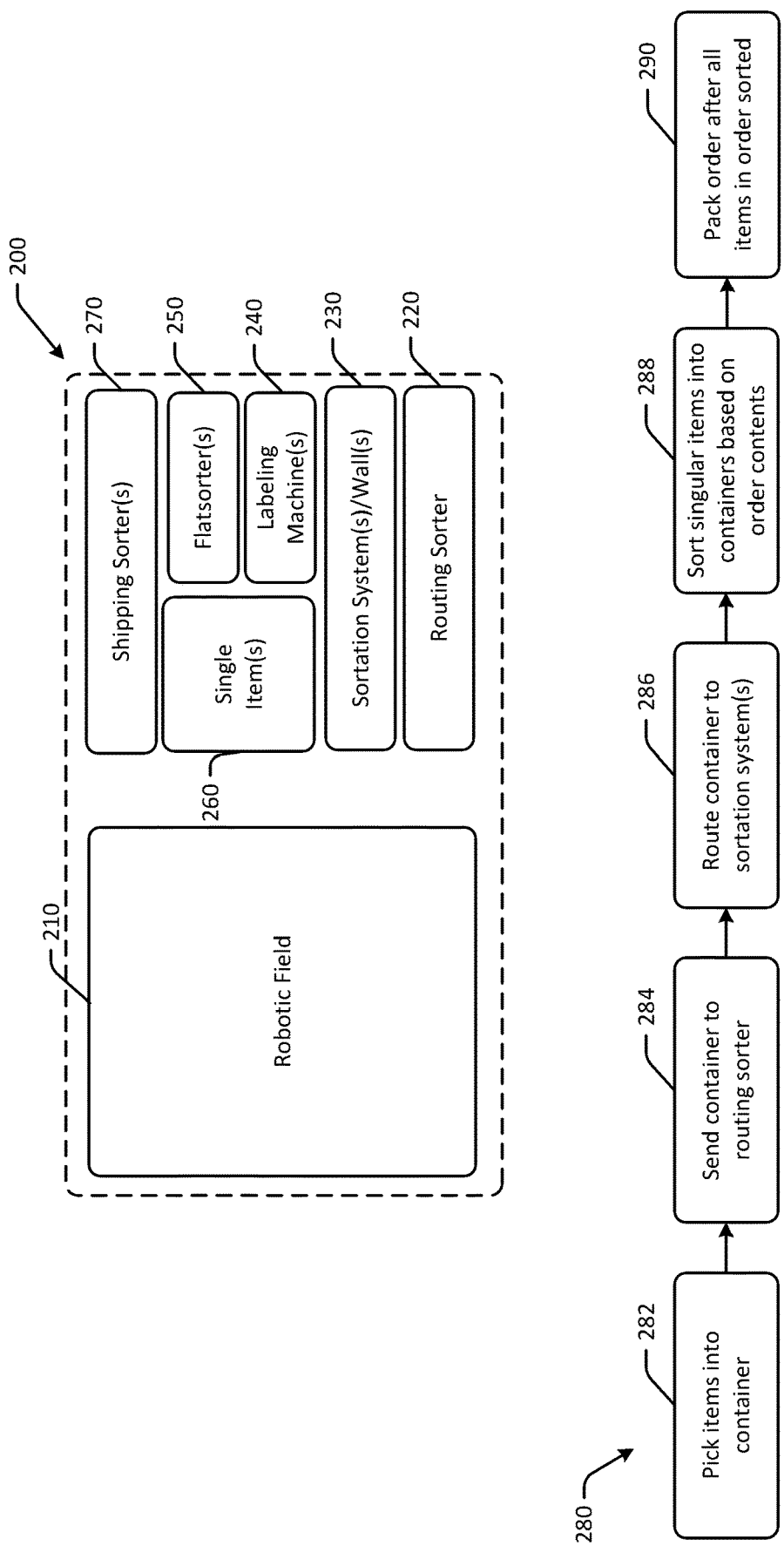
FIG. 2 is a hybrid schematic illustration of an example use case for external mobility systems for heavy machinery and equipment and an example process flow in accordance with one or more embodiments of the disclosure.

FIG. 2 is a hybrid schematic illustration of an example use case for external mobility systems for heavy machinery and equipment and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be sortation systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include external mobility systems for heavy machinery and equipment. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3A:
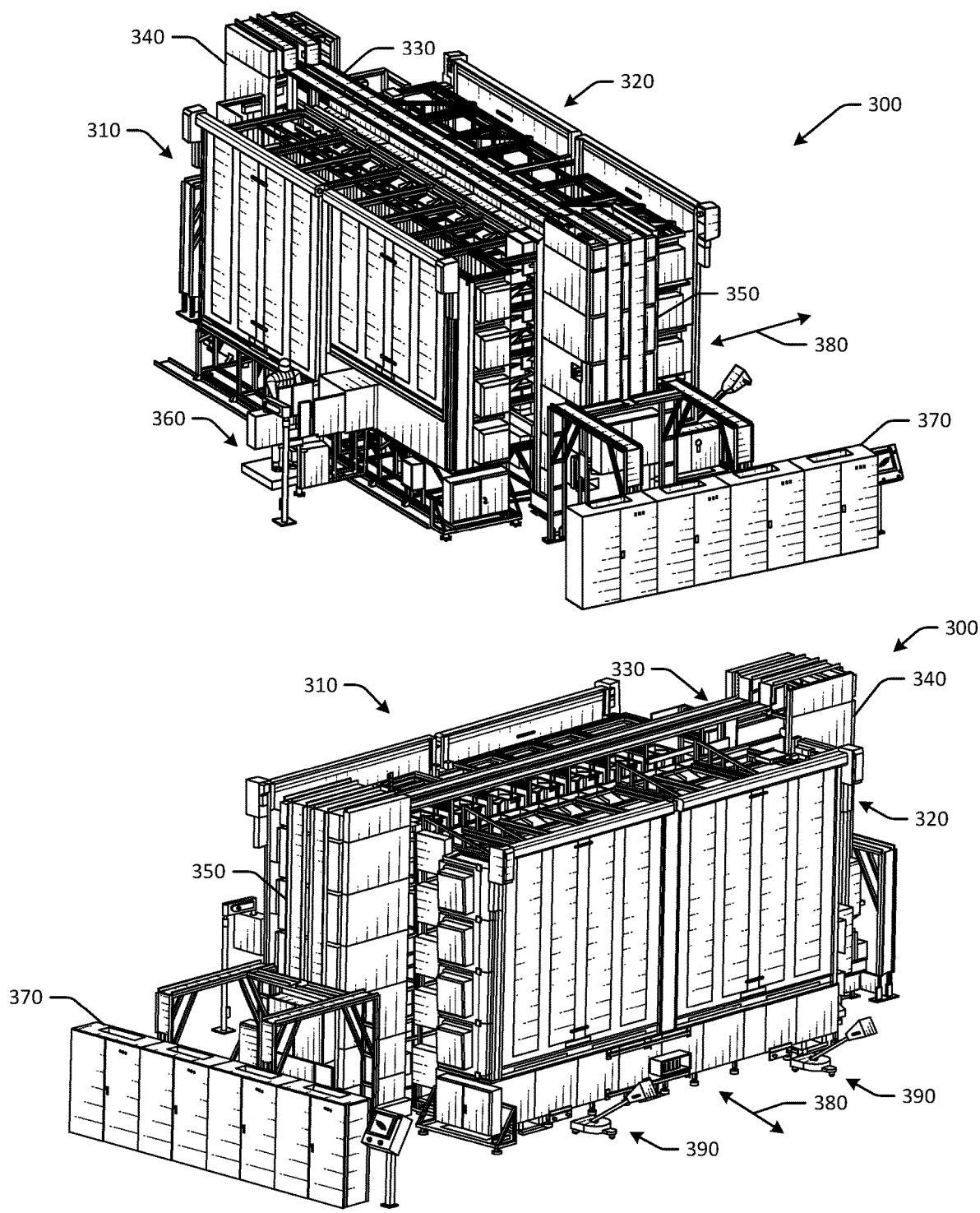
FIGS. 3A-3B are schematic illustrations of a sortation system that may be used with external mobility systems in accordance with one or more embodiments of the disclosure.
Figure 3B:
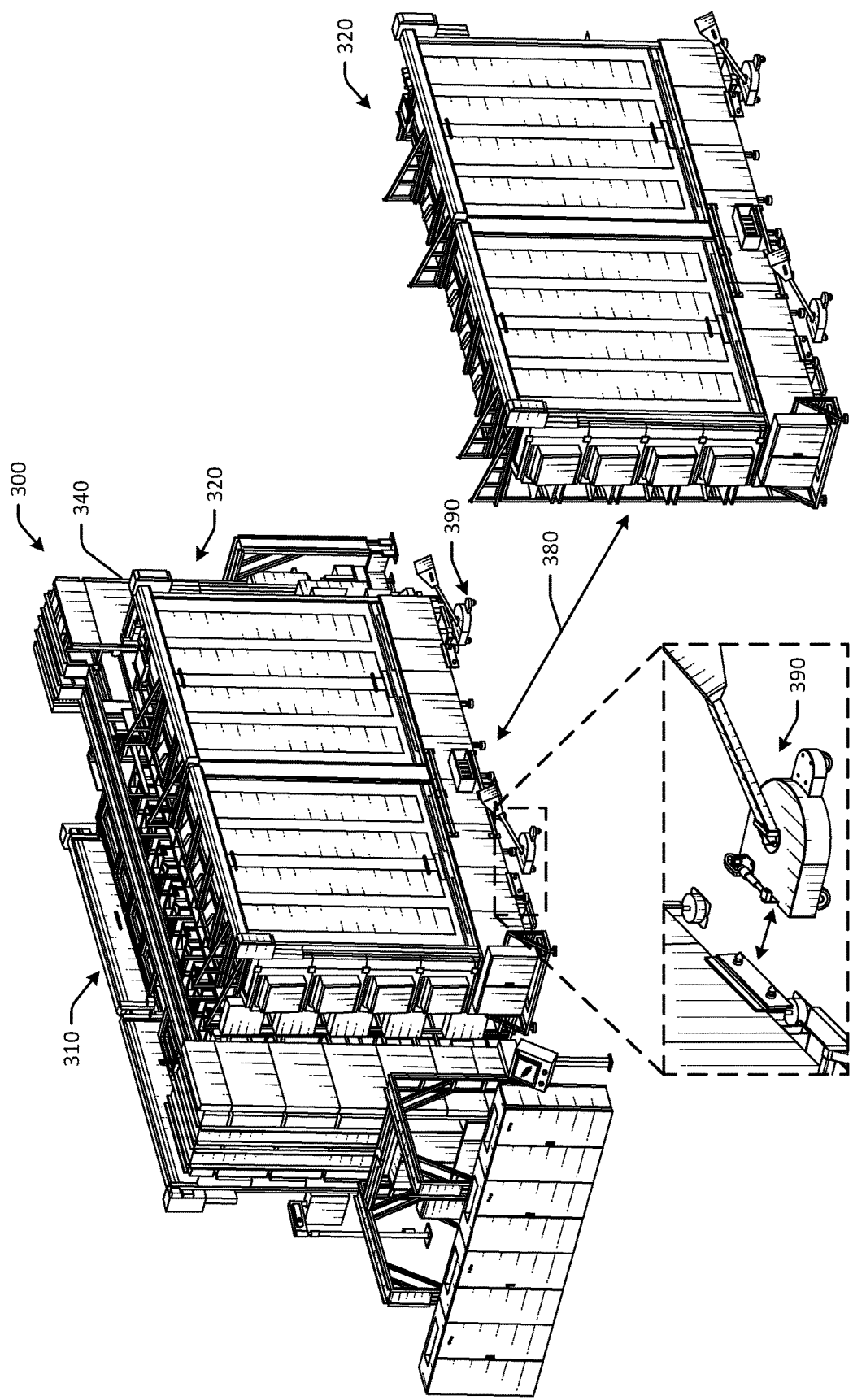

FIGS. 3A-3B are schematic illustrations of a sortation system 300 that may be used with external mobility systems in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3A, the sortation system 300 may include one or more modules or components. For example, the sortation system 300 may include a first tote rack or a first container matrix 310, and a second container matrix 320 separated by a central spine or an aisle 330. The sortation system 300 may include a first tote elevator 340, a second tote elevator 350, and an induction portion 360. The sortation system 300 may include a main control panel 370. The sortation system 300 may include a number or shuttles or mobile carrier units configured to move along the aisle 330. Other components may be included. Different embodiments may include additional or fewer components.

The first container matrix 310 and the second container matrix 320 may each be a modular rack system that includes one or more vertically spaced or horizontally spaced levels, where some or all of the levels may include container slots. The first container matrix 310 and the second container matrix 320 may house containers, such as totes, bins, bags, or other containers, that can be used to hold sorted items, such as items that correspond to certain orders. The containers may be stored at one or more different angles. The first container matrix 310 and the second container matrix 320 may include an array of containers with removable and/or rearrange-able container configurations. The containers may be of the same or different dimensions. The first container matrix 310 and the second container matrix 320 may include one or more levels, such as a first level and a second level. The first level may include a first plurality of container slots configured to receive individual containers, and the second level may include a second plurality of container slots configured to receive individual containers. The first level may be an upper level or lower level with respect to the second level.

The induction portion 360 may be an induction point for items, such as products or packages, that are input at the sortation system 300 for sortation. The sortation system 300 may include an outbound portion where containers that are full, or that include all of the items in an order, may be directed after completion of sortation. For example, containers that are ready to move to a different stage or portion of a fulfillment center may be retrieved from the respective container matrix by one or more of the mobile carrier units and delivered to the outbound portion of the sortation system 300.

The sortation system 300 may include an empty container intake portion where empty containers are input to the sortation system 300. For example, as full or completed containers are removed from container slots at the first container matrix 310 and the second container matrix 320, the container slots may be filled with empty containers. For example, one or more mobile carrier units may retrieve an empty container from the empty container intake portion and deliver the empty container to an empty container slot. In some embodiments, the mobile carrier unit may retrieve an empty container after delivering a completed container, such as by moving backwards or forwards along a track.

The sortation system 200 may include one or more tracks. The tracks may be used by the mobile carrier units to move between the respective portions of the sortation system 300. For example, the mobile carrier units may move along a certain track or set of tracks to reach a first container, and along a different set of tracks to reach a second container. Tracks may lead to different levels of the first container matrix 310 and the second container matrix 320.

The mobile carrier units may individually include one or more conveyor belts, such as cross-belt conveyors or other mechanical components, and may be configured to move along the respective tracks of the sortation system 300. The mobile carrier units may be configured to perform various functions, such as retrieving items, depositing items into containers on the different levels of the first container matrix 310 and the second container matrix 320, retrieving full containers from container slots, depositing empty containers into container slots, and other functions. The mobile carrier units may be controlled by one or more computer systems or controllers. The mobile carrier units may include at least two sidewalls on opposite sides of the mobile carrier unit. The sidewalls may be used to secure a payload. Some embodiments may not include sidewalls. Some embodiments may include one or more doors that can be opened or closed. For example, the mobile carrier unit may include a first door disposed transverse to the at least two sidewalls, where the mobile carrier unit is configured to automatically open and/or close the first door. In some instances, the first door, when in an open position, may form a chute that can be angled towards a container on a lower level. In some instances, the mobile carrier unit may include a second door disposed opposite the first door, where the mobile carrier unit is configured to automatically open and/or close the second door. Mobile carrier units that include multiple sidewalls and/or doors that serve as sidewalls may be used to secure various types of payloads, such as round balls or objects that may remain contained within the sidewalls during movement.

The sortation system 300 may be separated into distinct modules. During operation, the modules of the sortation system 300 may be disposed adjacent to each other, and the sortation system 300 may be arranged in a contracted configuration, such as that depicted in the perspective views of FIG. 3A. However, if maintenance or repairs are needed for various portions of the sortation system 300, such as repairs in the aisle 330, access to the components may be difficult.

Accordingly, the sortation system 300 may be configured such that individual modules of the sortation system 300 may be separated and removed from the remainder of the sortation system 300, so as to provide easy and safe access to the aisle 330 or other portions of the machine needing access.

For example, in the embodiment depicted in FIGS. 3A-3B, the second container matrix 320 may be configured to move along directions 380. The second container module 320 may be a mobile module of the sortation system 300. In other embodiments, other modules, such as the first container module 310, the elevators 340, 350, or other modules may be configured to move. Some embodiments may include more than one module that is configured to move.

As depicted in FIG. 3B, to move the second container matrix 320, or any other module of the sortation system 300, the module may first be lifted, such as using one or more removable air bearings positioned underneath the module, and may then be manually pulled using manual drive units 390 or other manual equipment, such as pallet jacks. The manual drive units 390 may attach to an interface plate mounted on the container matrix. In some embodiments, the manual drive units 390 may include compressed air powered traction motors. Operators may control the amount of throttle and speed at which the manual drive units 390 move. The module may then be separated from the remainder of the sortation system 300. In some embodiments, once a module is lifted using an air bearing system, the tugging force needed to move the module is reduced to 1-2% of the weight of the module due to the reduced friction.

The air bearing system may be removably coupled to the second container matrix 320 and may provide a lift force or may otherwise cause the second container matrix 320 to "float" as a freestanding component. The second container matrix 320 may then easily be pushed or pulled with manual effort. In some embodiments, the air bearing system may reduce a static friction required to move the second container matrix 320 or other module by 90% or more.

The sortation system 300 may therefore include a first module, such as the first container matrix 310, a second module (e.g., the second container matrix 320, etc.) coupled to the first module, and a third module (e.g., the first elevator 340, the second elevator 350, etc.) coupled to the first module and the second module. In other embodiments, the first module may be a module at which items are inducted into an item sortation system, the second module may include one or more tracks for item shuttles, and the third module may include a container matrix.

The modules may be coupled to the sortation system 300 via various mechanisms, such as a quick connect coupling mechanism. Quick connect coupling mechanisms may include latches, pins, and other systems. Such mechanisms may allow for rapid coupling and decoupling of modules, and may also provide visual feedback indicating whether or not a module is securely in place.

Some embodiments may include an air bearing system disposed under a module that is to be moved, where the air bearing system is configured to apply an upward force on the module. The air bearing system may be coupled to an air supply. In some embodiments, the air bearing system may be positioned underneath, but not physically coupled to, a module. In other embodiments, the air bearing system may be coupled to the module via one or more coupling devices.

The air bearing system may be configured to generate an upward force on the module to be moved. In some instances, the upward force may reduce a static friction of the module with respect to a floor surface by at least 90%, such that the module can slide from a default position (e.g., the contracted position depicted in FIG. 3A) to an expanded position (e.g., the expanded position depicted in FIG. 4). In some embodiments, modules that are moved may be free floating after the upward force is applied by the air bearing system or other system. After the upward force is applied, modules can be manually pushed and pulled, such as using the manual drive units 390 depicted in FIG. 3B.

Figure 4:
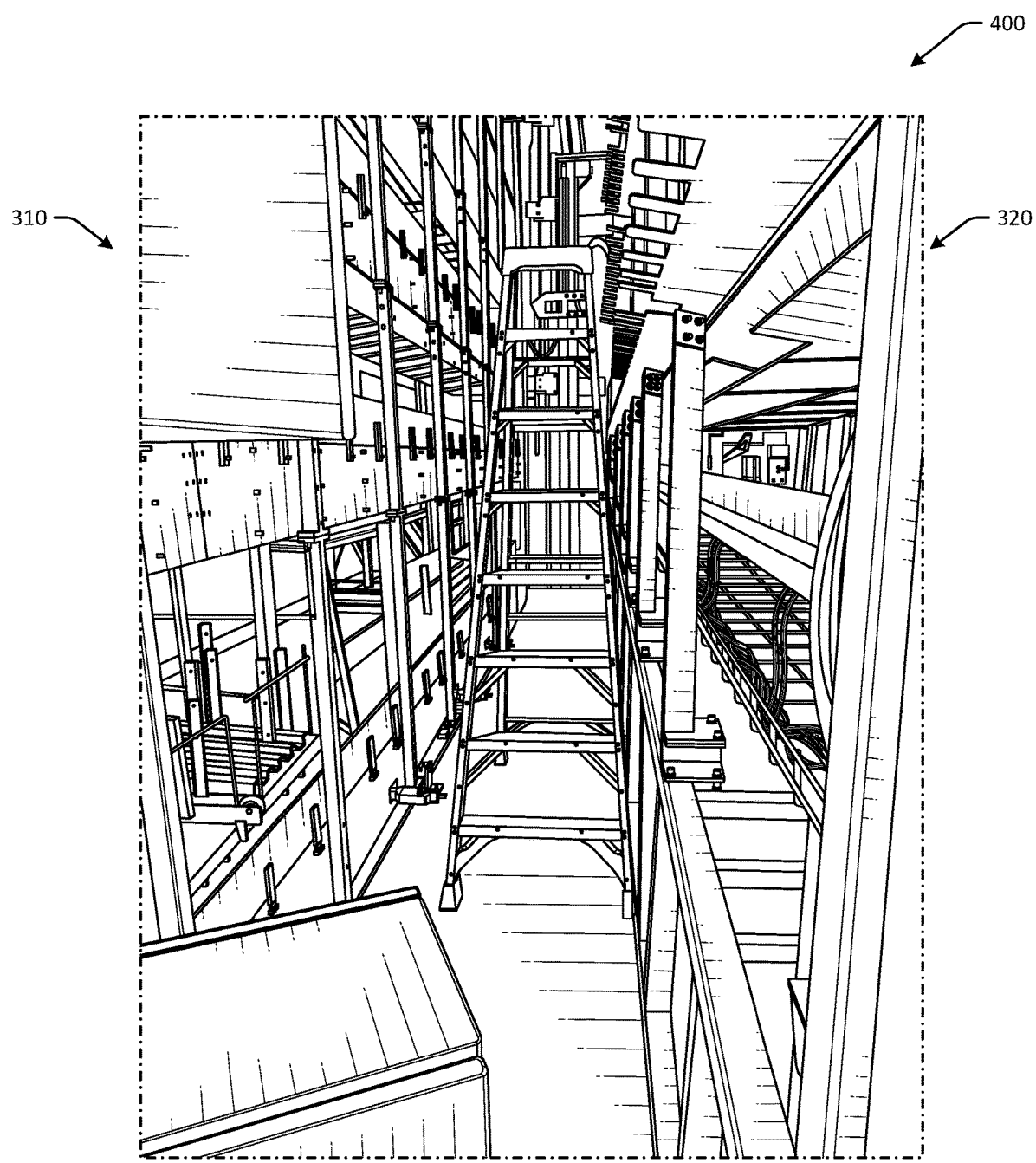
FIG. 4 is a schematic illustration of a space between separated modules of the sortation system of FIGS. 3A-3B when the sortation system is in an expanded configuration in accordance with one or more embodiments of the disclosure.

FIG. 4 is a schematic illustration of a space between separated modules of the sortation system of FIGS. 3A-3B when the sortation system is in an expanded configuration in accordance with one or more embodiments of the disclosure. Other embodiments may include additional or fewer components. The illustration of FIG. 4 is not to scale, and may not be illustrated to scale with respect to other figures. The sortation system illustrated in FIG. 4 may be the same sortation system discussed with respect to FIGS. 1-3B.

In the example of FIG. 4, the first container matrix 310 may be separated from the second container matrix 320 via movement of the second container matrix module 320 in direction 380. After the second container matrix 320 is moved, the sortation system 300 may be in an expanded configuration 400. In the expanded configuration, there may be additional space in the aisle 330 between the first container matrix 310 and the second container matrix 320. For example, as depicted in FIG. 4, a full size ladder may be positioned in the space created via movement of the second container matrix 320. Other equipment, such as forklifts, may be positioned in the space created via movement of the second container matrix 320.

To move modules of the sortation system 300 or other heavy machinery, an operator may disconnect a first module of the sortation system from a second module of the sortation system. An upward force may be applied to the first module using one or more air bearing systems. The first module may be slid away from the second module while the upward force is applied. To slide the first module, an operator may manually slide the first module away from the second module while the upward force is applied. In some embodiments, the module may be slide along a set of guide rails that may limit the direction and distance a module may travel. In other embodiments, the first module may be slide away from the second module using an autonomous vehicle or other automated device. In some embodiments, modules may be free floating after the upward force is applied.

Figure 5A:
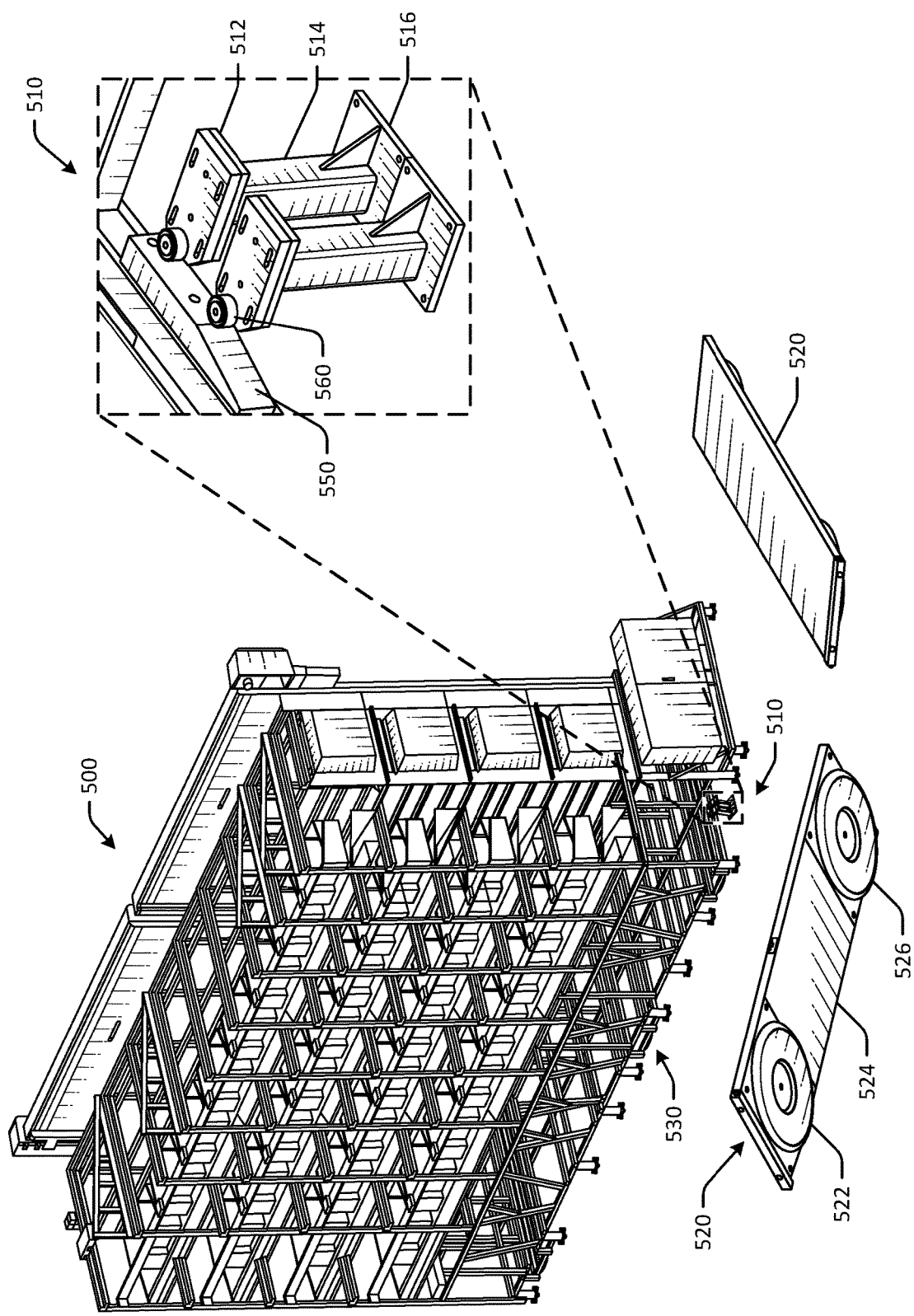
FIGS. 5A-5C are schematic illustrations of an air bearing-based external mobility system in accordance with one or more embodiments of the disclosure.
Figure 5B:
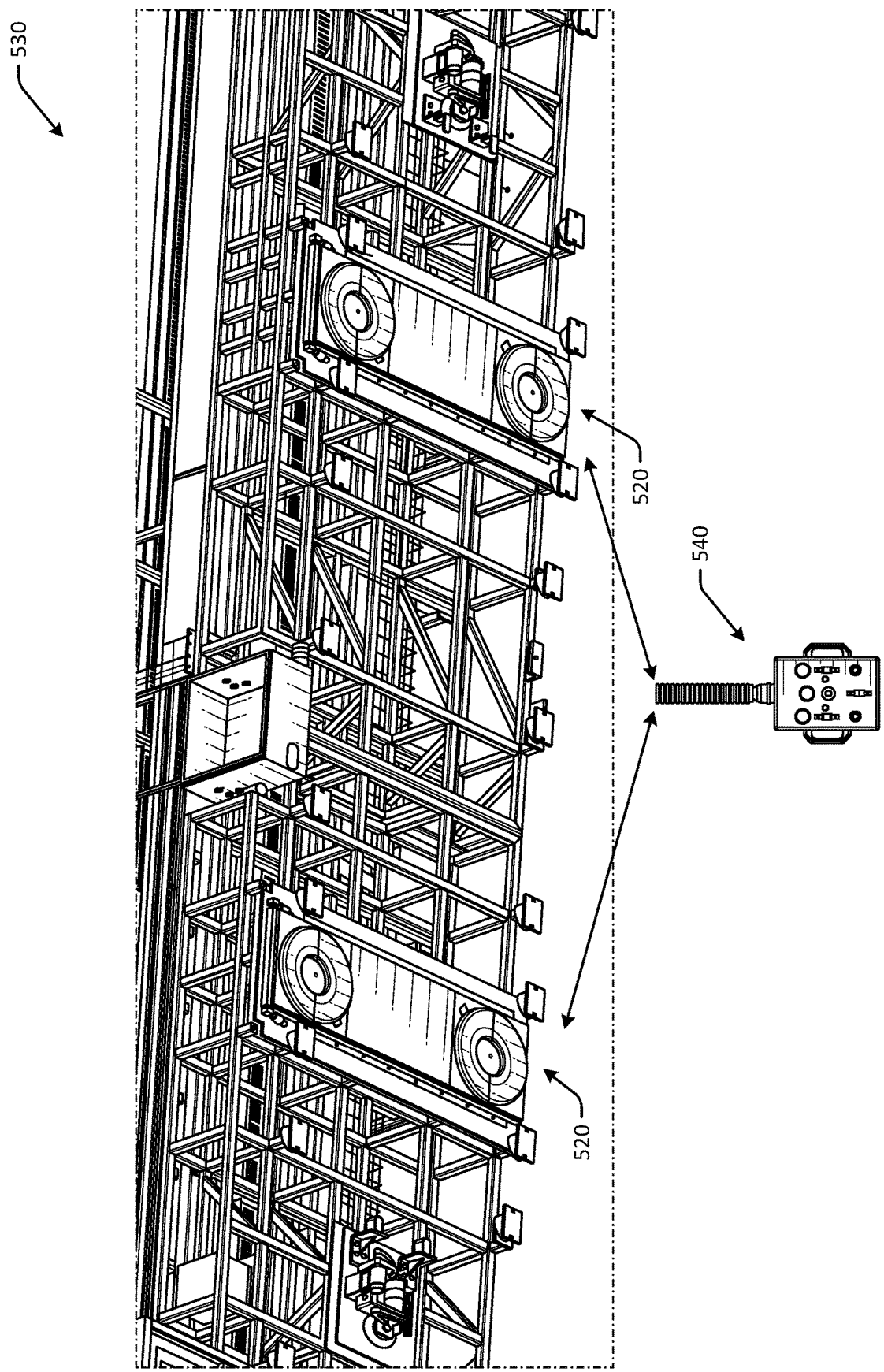
Figure 5C:
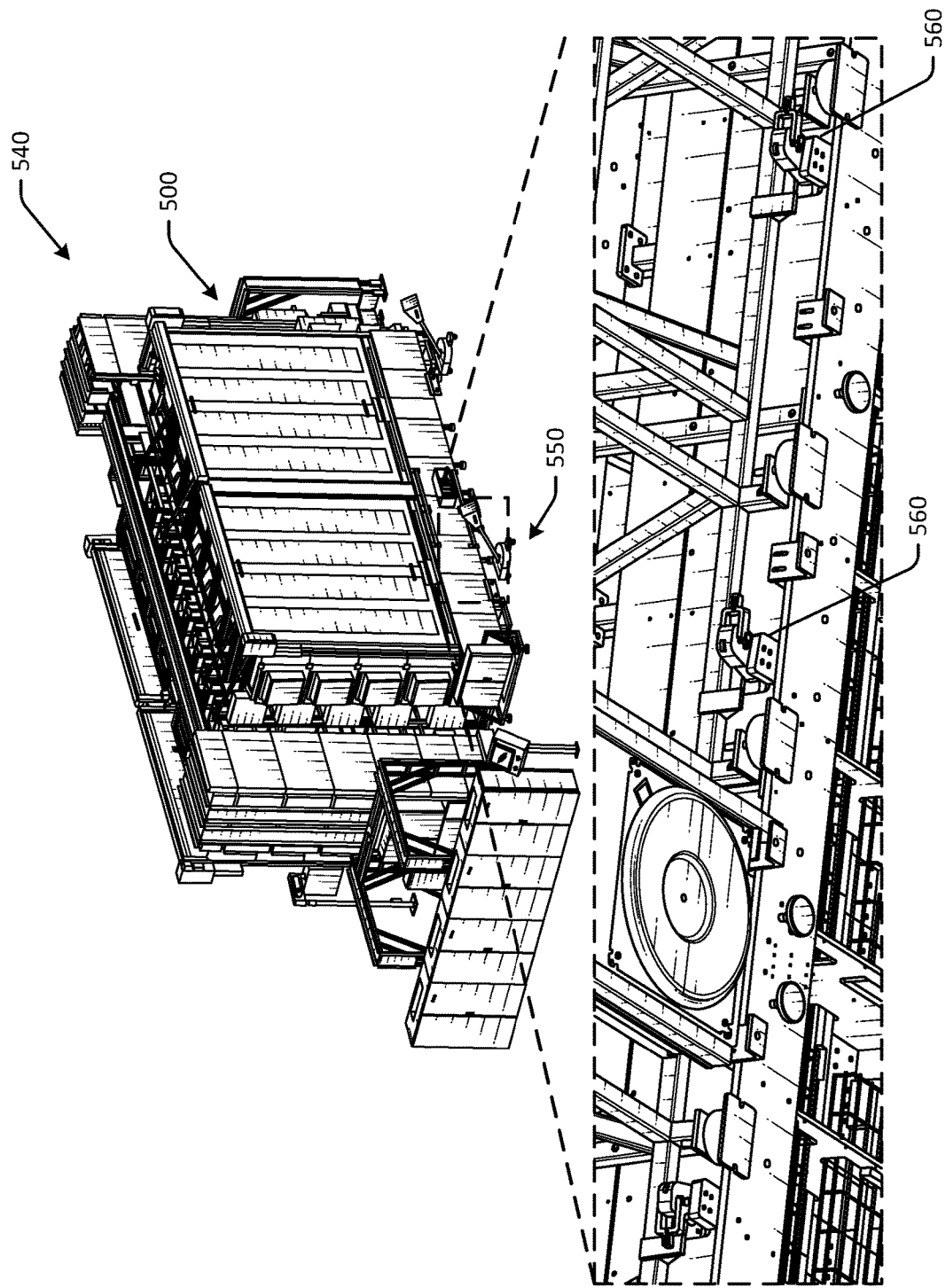

FIGS. 5A-5C are schematic illustrations of an air bearing-based external mobility system in accordance with one or more embodiments of the disclosure. Other embodiments may include additional or fewer components. The illustration of FIGS. 5A-5C may not be to scale, and may not be illustrated to scale with respect to other figures. The sortation systems illustrated in FIGS. 5A-5C may be the same sortation system discussed with respect to FIGS. 1-4.

In FIGS. 5A-5C, a moveable module 500 of a sortation system 540 is depicted. The moveable module 500 may be a container matrix or tote rack, an elevator, or another component of the sortation system. Other embodiments may be used with different types of heavy machinery.

To move the moveable module 500, one or more air bearings of an air bearing system 520 may be positioned under the moveable module 500 at various locations 530. Air may be supplied to the air bearing system 520, and an upward force may be generated at a bottom of the moveable module 500. The individual air bearings may include a body 524, and one or more orifices, such as a first caster 522 and a second caster 526, where high pressure air may flow through to provide the upward force. As the upward force is applied, a static friction that must be overcome for movement of the moveable module 500 may decrease (e.g., static friction between the moveable module 500 and the floor, etc.). In some instances, the upward force may effectively reduce a weight of the moveable module 500 by reducing the amount of force needed to move or slide the moveable module 500 across the floor. The reduction in force needed may be about 90% Similarly, the reduction to static friction may be about 90%.

Any number of air bearings may be used. In one embodiment, three air bearings may be used to move the moveable module 500. The air bearings may be configured to lift a payload of 14,000 pounds individually, or 42,000 pounds combined. The moveable module 500 may have a weight of about 35,000 pounds when fully loaded. Accordingly, maximum capacity of the air bearing system may not be needed.

The sortation system may include rack guide rollers 510 to assist with guiding movement of the moveable module 500. Unlike other embodiments, the sortation system may not include guide rails. Instead, the rack guide rollers 510 may be used to ensure alignment during engagement and disengagement of the moveable module 500. The rack guide rollers 510 may include a roller head 512, a stem 514, and a base 516 used to guide the moveable module 500 as it moves away from, or towards, the sortation system. For example, the rack guide rollers 510 may include one or more rollers 560 that guide a wedge component 550 to a certain position. The dimensions, configuration, and/or angle of the wedge component 550 may be modified so as to provide a gradual guiding of the moveable module 500 towards and/or away from the sortation system. For example, the wedge component 550 may be used to align the moveable module 500 with the sortation system as the moveable module 500 is pushed towards the sortation system.

In FIG. 5B, the bottom of the moveable module 500 is depicted in perspective view with the air bearing system 520 in position. Airflow to the air bearing system 520 may be controlled by a controller 540, which may be configured to regulate airflow, and in turn, upward force generated by the air bearing system 520.

In some embodiments, instead of using manual drive units 390 as described in FIG. 3A-3B, the traction drive units may be integrated into the module itself, and the module can be moved without the use of manual equipment. Instead, an operator may use the controller 540 to control both the upward lift provided by the air bearing system 520, as well as the lateral force provided by the traction drive units to move the moveable module 500 away from or towards the sortation system.

In FIG. 5C, the sortation system 540 is depicted with the moveable module 500 in a retracted configuration. The sortation system 540 may include positive locking mechanisms, such as clamps 560 disposed under the moveable module 500, that provide additional rigidity and stability while the sortation system 540 is in operation. The clamps 560 may be pneumatically actuated clamps that hold the moveable module in place. The clamps 560 may be mounted on the center spine structure which is static and anchored solidly to the floor. Any number of clamps may be used. In some embodiments, the clamps 560 may be used as a positive locator mechanism that is coupled to a set of guide rails or another portion of a sortation machine. The positive locator mechanism may be configured to indicate that a moveable module is positioned in the default or contracted position. Some embodiments may include one or more sensors configured to indicate that the movable module is positioned in the default position.

Figure 6:
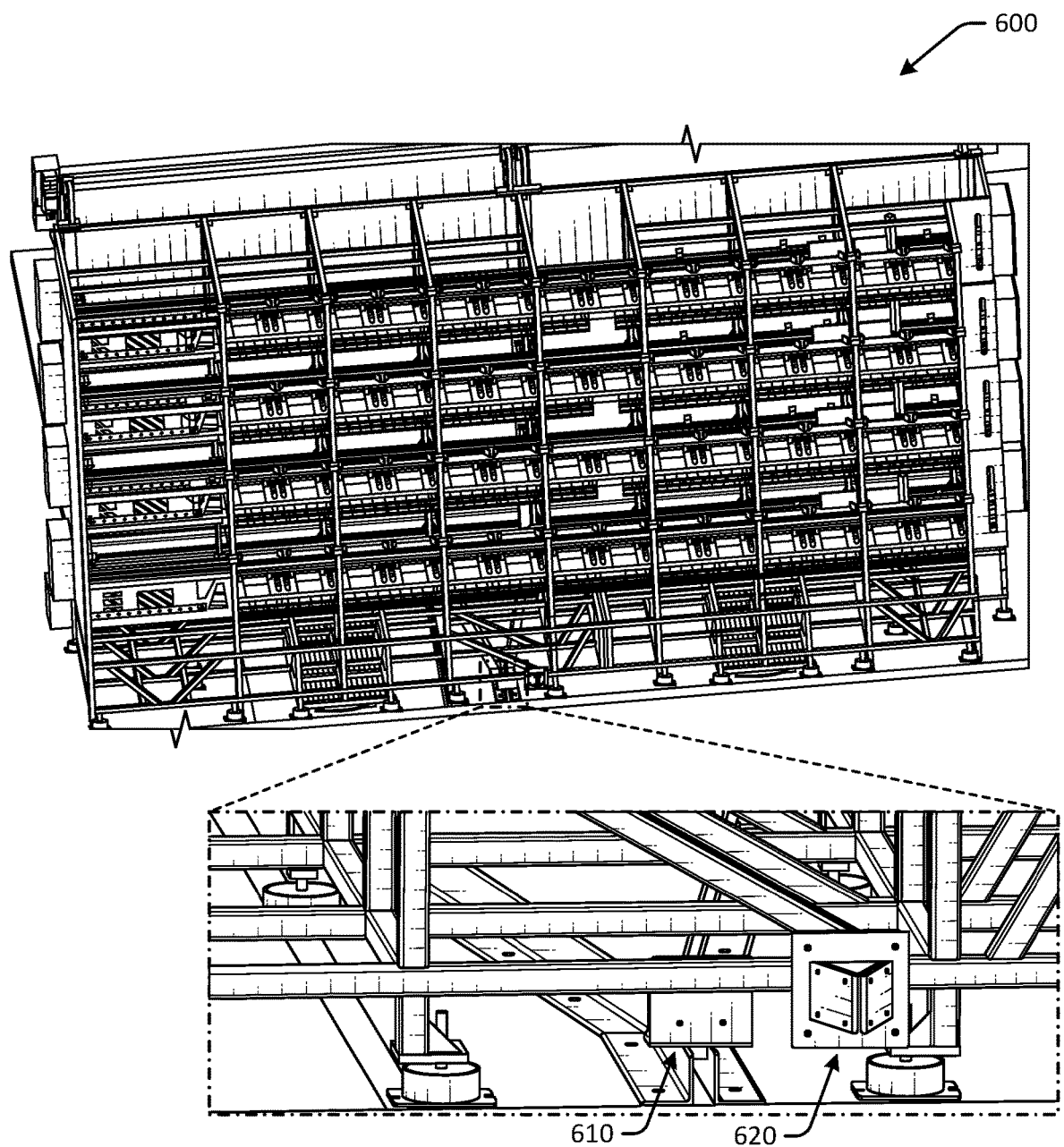
FIG. 6 is a schematic illustration of guide rails used to guide movement of machine modules in accordance with one or more embodiments of the disclosure.

FIG. 6 is a schematic illustration of guide rails used to guide movement of machine modules in accordance with one or more embodiments of the disclosure. Other embodiments may include additional or fewer components. The illustration of FIG. 6 is not to scale, and may not be illustrated to scale with respect to other figures. The sortation system illustrated in FIG. 6 may be the same sortation system discussed with respect to FIGS. 1-5C.

In FIG. 6, a moveable module 600 of a sortation system may be a container matrix or a tote rack. To ensure straight and aligned movement of the moveable module 600, instead of using support rollers, embodiments may use a combination of guide rails 610 and a wedge receiver interface 620. The wedge receiver interface 620 may include a wedge on the moveable module 600 that interacts with a receiver on the center spine or aisle. This may provide positive positioning feedback and allow for rapid realignment of the module when moving towards or away from the sortation system. The guide rails 610 may be completely removable to provide a floor surface that is free of obstacles, thereby allowing forklifts and other equipment to be moved behind the moveable module 600. The guide rails 610 may be a set of guide rails coupled to the sortation system, where one or more modules are configured to slide along the set of guide rails. In some instances, the module may be slide or otherwise moved after the upward force is applied to the module. One or more portions of the set of guide rails may be removable, so as to provide a clear path between the moved module and the sortation system or other equipment.

Figure 7:
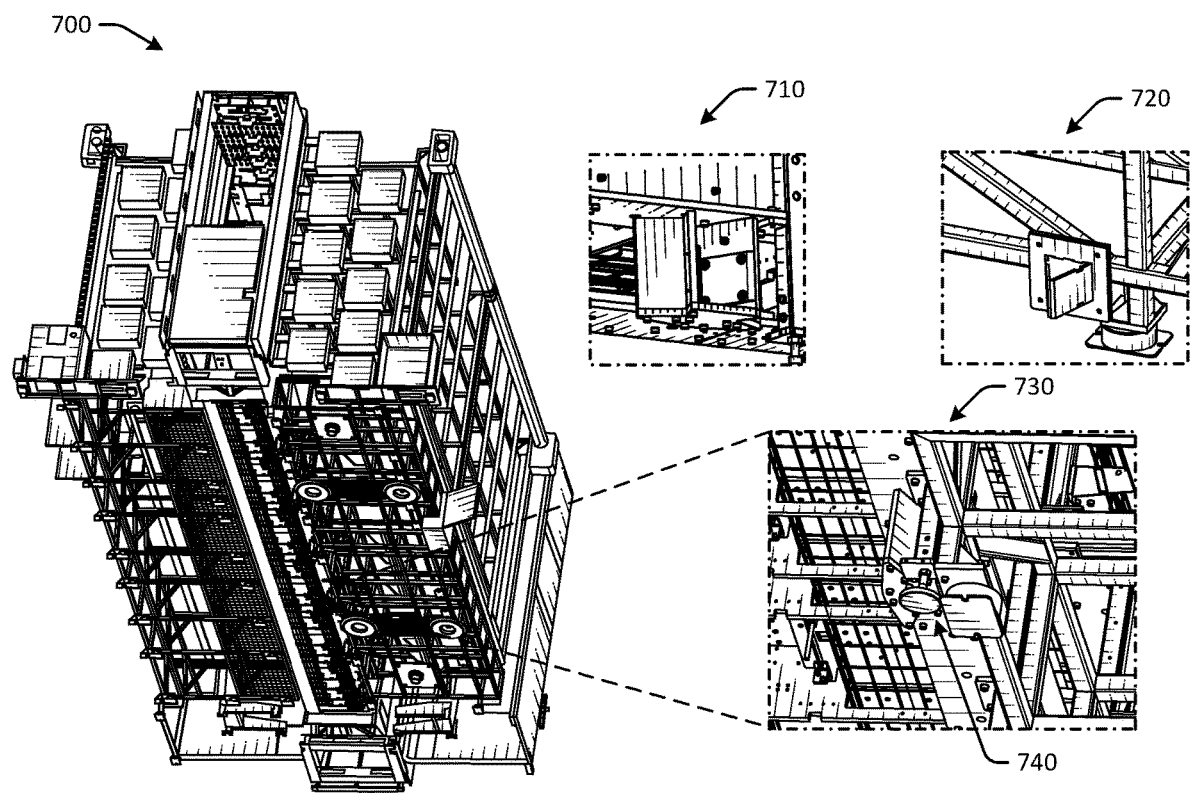
FIG. 7 is a schematic illustration of quick connect and disconnect components used to release and secure machine modules in accordance with one or more embodiments of the disclosure.

FIG. 7 is a schematic illustration of quick connect and disconnect components used to release and secure machine modules in accordance with one or more embodiments of the disclosure. Other embodiments may include additional or fewer components. The illustration of FIG. 7 is not to scale, and may not be illustrated to scale with respect to other figures. The sortation system illustrated in FIG. 7 may be the same sortation system discussed with respect to FIGS. 1-6.

In FIG. 7, a sortation system 700 may include any number of moveable modules, such as a container matrix or a tote rack. To ensure straight and aligned movement of the moveable module, embodiments may use a combination of a wedge receiver 710 and a wedge 720. The wedge receiver 710 may be disposed on the center spine, and the wedge 720 may be disposed on the module, or vice versa. The wedge 720 may be disposed on the moveable module that interacts with the wedge receiver 710 on the center spine or aisle. This may provide positive positioning feedback and allow for rapid realignment of the module when moving towards or away from the sortation system. Some embodiments may include removable guide rails to provide a floor surface that is free of obstacles, thereby allowing forklifts and other equipment to be moved behind the moveable module. As depicted in bottom perspective view 730, the wedge 720 and the wedge receiver 710 may be used to guide the module back to the default position 740 (e.g., adjacent to the sortation system, etc.) after repairs are completed.

Figure 8:
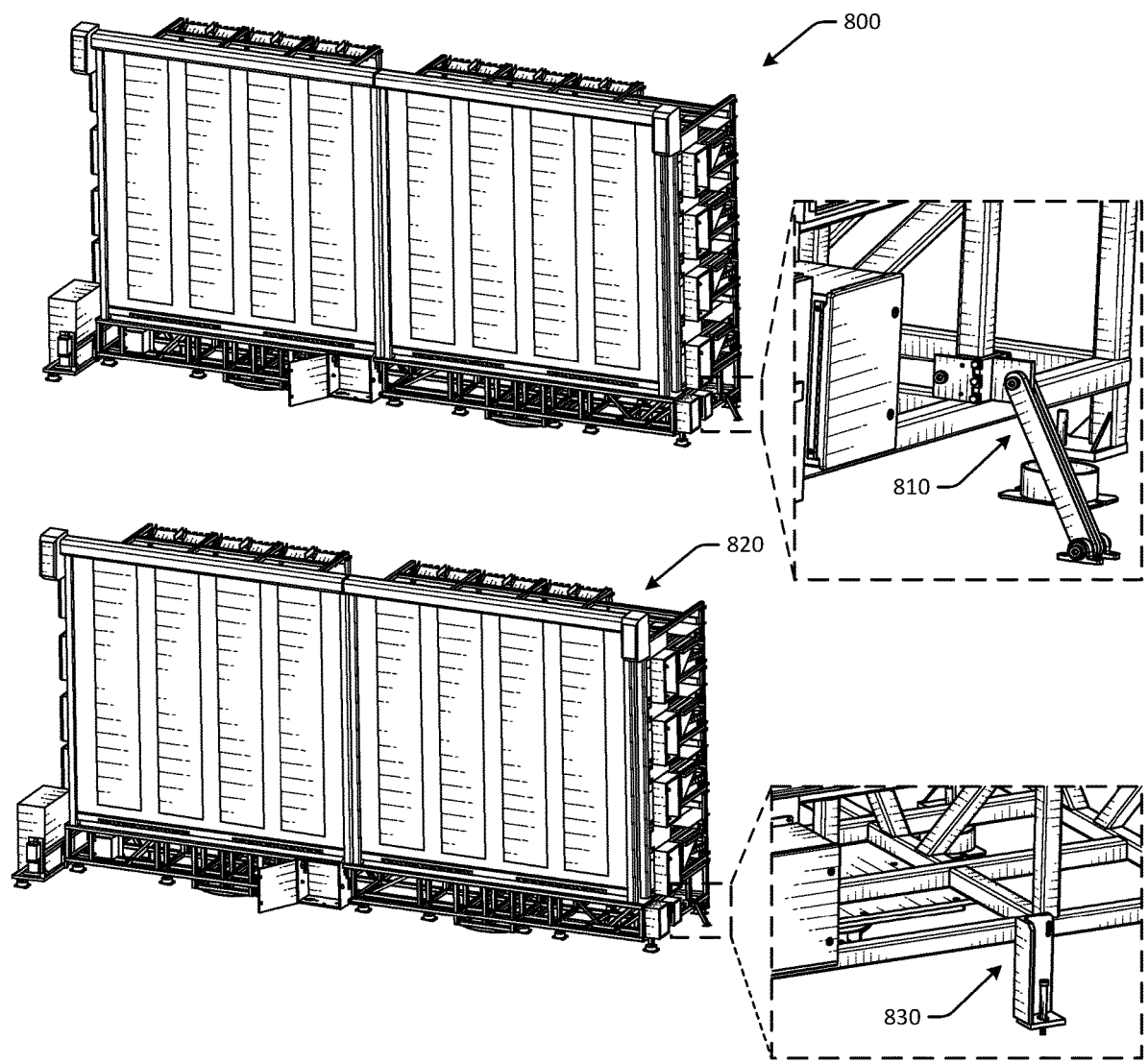
FIG. 8 is a schematic illustration of components used to secure machine modules in accordance with one or more embodiments of the disclosure.

FIG. 8 is a schematic illustration of components used to secure machine modules in accordance with one or more embodiments of the disclosure. Other embodiments may include additional or fewer components. The illustration of FIG. 8 is not to scale, and may not be illustrated to scale with respect to other figures. The sortation system illustrated in FIG. 8 may be the same sortation system discussed with respect to FIGS. 1-7.

In FIG. 8, an example moveable module 800 can be separated from the remainder of a sortation system. Once removed, the moveable module 800 may be secured in place by a manually or automatically actuated latch or stanchion 810. In some embodiments, the stanchion 810 may be manually moved into place to lock the moveable module 800 at a certain position, while in other embodiments, the stanchion 810 may be controlled automatically using an actuator. One or more stanchions 810 may be used to secure the moveable module 800 in a particular position.

In another embodiment, another moveable module 820 can be separated from the remainder of a sortation system. Once removed, the moveable module 820 may be secured in place by a manually or automatically actuated pin and hole system 830. The pin and hole system 830 may include a pin that is dropped into a hole in the ground or in another structure to lock the moveable module 820 into position. In some embodiments, the pin and hole system 830 may be manually moved into place to lock the moveable module 820 at a certain position, while in other embodiments, the pin and hole system 830 may be controlled automatically using an actuator. One or more pin and hole systems 830 may be used to secure the moveable module 820 in a particular position.

Figure 9:
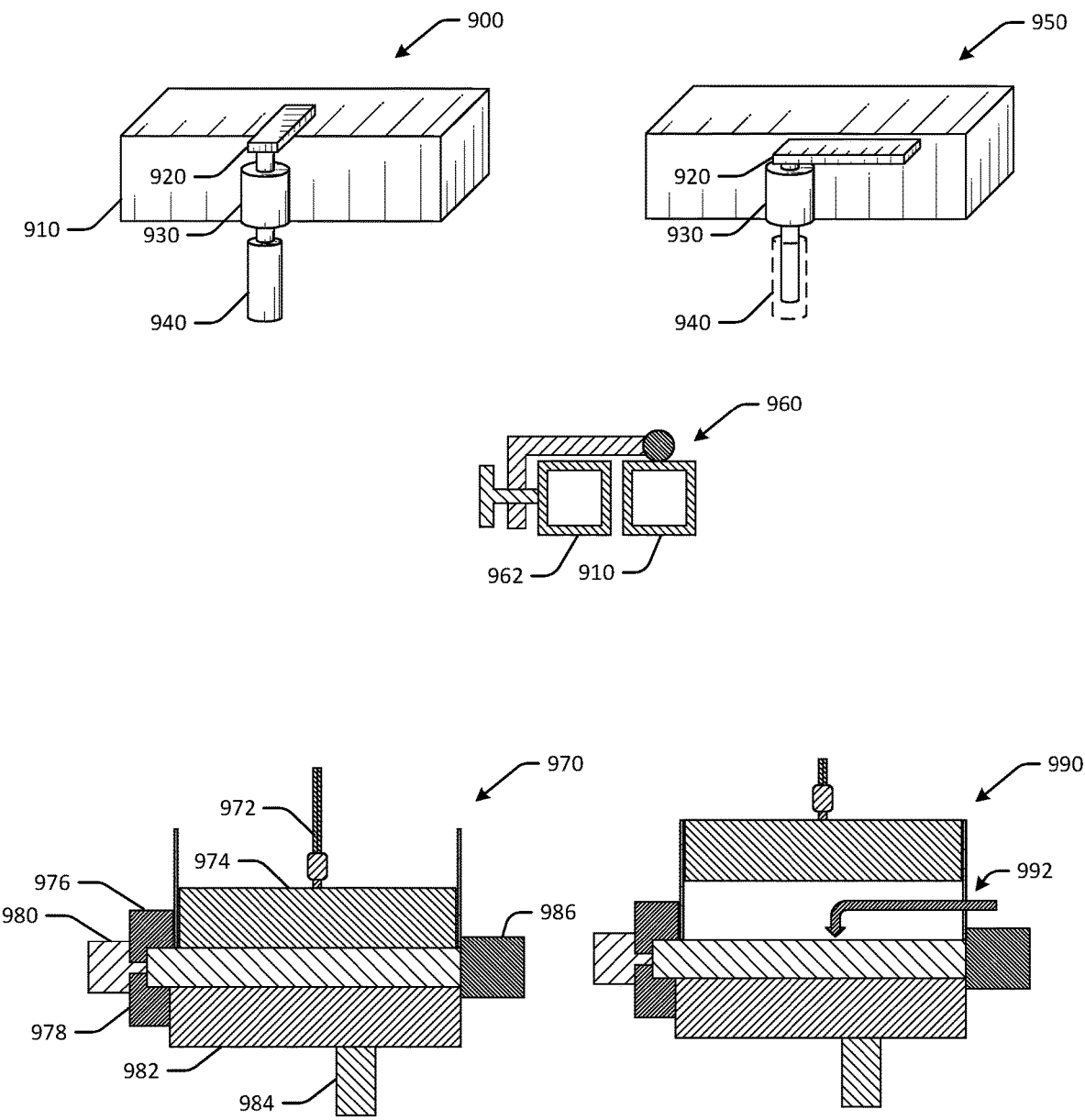
FIG. 9 is a schematic illustration of components used to secure machine modules in accordance with one or more embodiments of the disclosure.

FIG. 9 is a schematic illustration of components used to secure machine modules in accordance with one or more embodiments of the disclosure. Other embodiments may include additional or fewer components. The illustration of FIG. 8 is not to scale, and may not be illustrated to scale with respect to other figures. The system illustrated in FIG. 8 may be used with the sortation systems discussed with respect to FIGS. 1-7 or other heavy machinery.

A first embodiment of a locking mechanism 900 may be used to lock a moveable module into a certain position. The locking mechanism 900 may include a moveable structure 910 (represented as a block in FIG. 9), a rotatable locking pin 920, a cylinder 930 that is welded or otherwise coupled to the moveable structure 910, and a hole in the ground 940. As depicted in a locked position 950, the rotatable locking pin 920 may be rotated and dropped to lock the moveable structure 910 into a fixed position. To release the moveable structure 910 from a locked position, the rotatable locking pin 920 may be lifted and removed from the hole 940. As shown in schematic side view 960, a fixed structure 962 may be used to secure the moveable structure 910 in a certain fixed position. In some embodiments, the locking mechanism 900 may be automatically controlled, while in others, the locking mechanism 900 may be manually actuated.

In another embodiment, autonomous guided vehicles may be used to control movement of moveable modules. For example, a sortation system 970 may include a first elevator 980, a second elevator 986, a first tote elevator 976, a second tote elevator 978, a first moveable module 974, a second moveable module 982, an induction station 984, and a magnetic guide 972 for an autonomous guided vehicle.

As depicted in an expanded configuration 990, the autonomous guided vehicle may pull the first moveable module 972 away from the sortation system 970, so as to create space 992 that can be used to access internal components of the sortation system 970. Such embodiments may still utilize air bearing systems as described herein. Some embodiments may be configured to create space of about 8 feet. In one example, an actuator may be configured to move a module from a default position to the expanded position. In other embodiments, an autonomous guided vehicle may be configured to move the module from the default position to the expanded position.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 10:
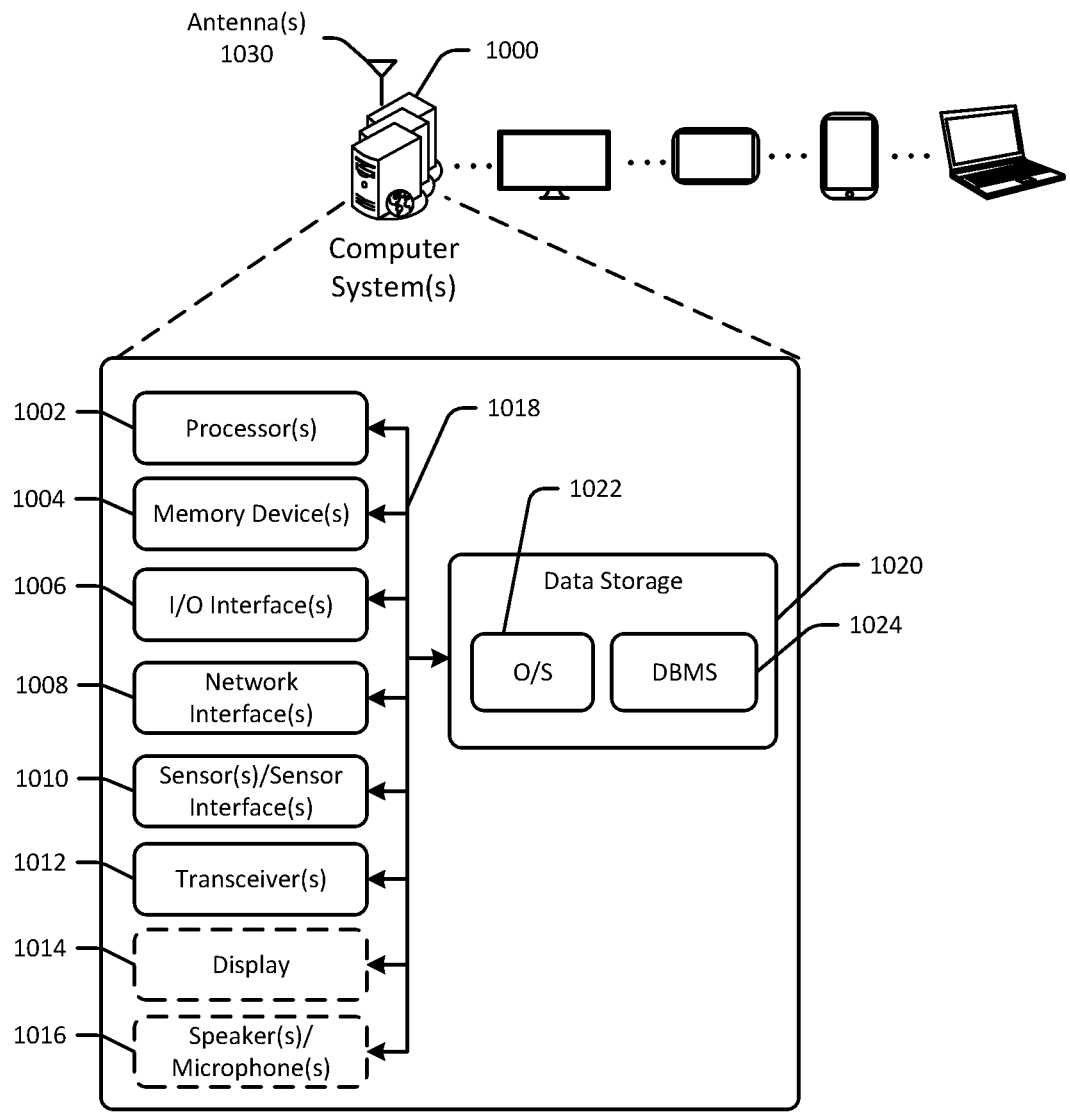
FIG. 10 schematically illustrates an example architecture of a computer system associated with a sortation system in accordance with one or more embodiments of the disclosure.

FIG. 10 is a schematic block diagram of one or more illustrative computer system(s) 1000 in accordance with one or more example embodiments of the disclosure. The computer system(s) 1000 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1000 may correspond to an illustrative device configuration for the controller(s) or computer system(s) of FIGS. 1-9.

The computer system(s) 1000 may be configured to communicate with one or more servers, user devices, or the like. The computer system(s) 1000 may be configured to control mobile carrier unit, sortation system components, and/or automated module movement systems.

The computer system(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1000 may include one or more processors (processor(s)) 1002, one or more memory devices 1004 (also referred to herein as memory 1004), one or more input/output (I/O) interface(s) 1006, one or more network interface(s) 1008, one or more sensor(s) or sensor interface(s) 1010, one or more transceiver(s) 1012, one or more optional display(s) 1014, one or more optional microphone(s) 1016, and data storage 1020. The computer system(s) 1000 may further include one or more bus(es) 1018 that functionally couple various components of the computer system(s) 1000. The computer system(s) 1000 may further include one or more antenna(s) 1030 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit the exchange of information (e.g., data (including computer-executable code), signaling, etc.) between various components of the computer system(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1004 of the computer system(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to the memory 1004 for use by the processor(s) 1002 during the execution of the computer-executable instructions. Moreover, output data generated as a result of execution of the computer-executable instructions by the processor(s) 1002 may be stored initially in the memory 1004, and may ultimately be copied to the data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like. Some or all of these module(s) may be sub-module(s). Any of the components depicted as being stored in the data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in the data storage 1020 may support functionality described in reference to corresponding components named earlier in this disclosure.

The data storage 1020 may further store various types of data utilized by the components of the computer system(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute the computer-executable instructions loaded therein. For example, the processor(s) 1002 may be configured to execute the computer-executable instructions of the various program module(s), applications, engines, or the like of the computer system(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to other illustrative components depicted as being stored in the data storage 1020, the 0/S 1022 may be loaded from the data storage 1020 into the memory 1004 and may provide an interface between other application software executing on the computer system(s) 1000 and the hardware resources of the computer system(s) 1000. More specifically, the 0/S 1022 may include a set of computer-executable instructions for managing the hardware resources of the computer system(s) 1000 and for providing common services to other application programs (e.g., managing memory allocation among various application programs). In certain example embodiments, the 0/S 1022 may control execution of the other program module(s). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1000 is a mobile device, the DBMS 1024 may be any suitable lightweight DBMS optimized for performance on a mobile device.

Referring now to other illustrative components of the computer system(s) 1000, the input/output (I/O) interface(s) 1006 may facilitate the receipt of input information by the computer system(s) 1000 from one or more I/O devices as well as the output of information from the computer system(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1030 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1000 may further include one or more network interface(s) 1008 via which the computer system(s) 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna(s) 1030 may include any suitable type of antenna depending, for example, on the communications protocols used to transmit or receive signals via the antenna(s) 1030. Non-limiting examples of suitable antennas may include directional antennas, non-directional antennas, dipole antennas, folded dipole antennas, patch antennas, multiple-input multiple-output (MIMO) antennas, or the like. The antenna(s) 1030 may be communicatively coupled to one or more transceivers 1012 or radio components to which or from which signals may be transmitted or received.

As previously described, the antenna(s) 1030 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1030 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11 ad). In alternative example embodiments, the antenna(s) 1030 may be configured to transmit or receive radio frequency signals within any suitable frequency range forming part of the unlicensed portion of the radio spectrum.

The antenna(s) 1030 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1030—transmitting or receiving radio frequency (RF) signals in the bandwidth and/or channels corresponding to the communications protocols utilized by the computer system(s) 1000 to communicate with other devices. The transceiver(s) 1012 may include hardware, software, and/or firmware for modulating, transmitting, or receiving—potentially in cooperation with any of antenna(s) 1030—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computer system(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1014 may be configured to output light and/or render content. The optional speaker(s)/microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computer system(s) 1000 may include alternate and/or additional hardware, software, or firmware components beyond those described or depicted without departing from the scope of the disclosure. More particularly, it should be appreciated that software, firmware, or hardware components depicted as forming part of the computer system(s) 1000 are merely illustrative and that some components may not be present or additional components may be provided in various embodiments. While various illustrative program module(s) have been depicted and described as software module(s) stored in the data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sortation system comprising:
    a first module at which items are inducted into the item sortation system;
    a second module coupled to the first module, wherein the second module comprises one or more tracks for item shuttles;
    a third module coupled to the first module and the second module, wherein the third module comprises a container matrix;
    a quick connect coupling mechanism, wherein the third module is coupled to the second module using the quick connect coupling mechanism;
    an air bearing system disposed under the third module, the air bearing system configured to apply an upward force on the third module; and
    an air supply coupled to the air bearing system;
    wherein the upward force on the third module reduces a static friction of the third module with respect to a floor surface by at least 90%, such that the third module can be manually pulled from a default position to an expanded position.

2. The item sortation system of claim 1, further comprising:
    a set of guide rails coupled to the third module, wherein the third module is configured to slide along the set of guide rails after the upward force is applied to the third module; and
    wherein one or more portions of the set of guide rails are removable, so as to provide a clear path between the second module and the third module.

3. The item sortation system of claim 1, further comprising:
    an actuator configured to move the third module from the default position to the expanded position.

4. The item sortation system of claim 1, further comprising:
    an autonomous guided vehicle configured to move the third module from the default position to the expanded position.

5. A system comprising:
    a first module;
    a second module coupled to the first module;
    a third module coupled to the first module and the second module;
    a set of guide rails coupled to the third module;
    an air bearing system disposed under the third module, the air bearing system configured to apply an upward force on the third module; and
    an air supply coupled to the air bearing system;
    wherein the upward force on the third module reduces a static friction of the third module with respect to a floor surface by at least 90%, such that the third module can slide from a default position to an expanded position, and wherein the third module is configured to slide along the set of guide rails after the upward force is applied to the third module.

6. The system of claim 5, wherein the first module is a module at which items are inducted into an item sortation system, wherein the second module comprises one or more tracks for item shuttles, and wherein the third module comprises a container matrix.

7. The system of claim 5, further comprising:
a quick connect coupling mechanism;
wherein the third module is coupled to the second module using the quick connect coupling mechanism.

8. The system of claim 5, wherein one or more portions of the set of guide rails are removable, so as to provide a clear path between the second module and the third module.

9. The system of claim 5, further comprising:
a positive locator mechanism coupled to the set of guide rails, wherein the positive locator mechanism is configured to indicate that the third module is positioned in the default position.

10. The system of claim 5, further comprising:
a sensor configured to indicate that the third module is positioned in the default position.

11. The system of claim 5, further comprising:
an actuator configured to move the third module from the default position to the expanded position.

12. The system of claim 5, wherein the third module is free floating after the upward force is applied.

13. The system of claim 5, wherein the air bearing system is not attached to the third module.

14. The system of claim 5, wherein the third module can be manually pushed and pulled after the upward force is applied.

15. A method comprising:
disconnecting a first module of an item sortation system from a second module of the item sortation system;
applying an upward force to the first module using one or more air bearing systems; and
sliding the first module away from the second module using an autonomous vehicle while the upward force is applied.

16. The method of claim 15, wherein sliding the first module away from the second module comprises manually sliding the first module away from the second module while the upward force is applied.

17. The method of claim 15, wherein sliding the first module away from the second module comprises sliding the first module away from the second module along a set of guide rails.

18. The method of claim 15, wherein the first module is free floating after the upward force is applied.

19. The method of claim 17, wherein one or more portions of the set of guide rails are removable, so as to provide a clear path between the second module and the third module.

20. The method of claim 15, wherein the first module can be manually pushed and pulled after the upward force is applied.

* * * * *